United States Patent [19]

Colodney et al.

[11] 4,181,633

[45] * Jan. 1, 1980

[54] LIQUID SCOURING CREAM CONTAINING CALCIUM METASILICATE

[75] Inventors: Daniel Colodney, Somerville; Martin Cordon, Highland Park, both of N.J.

[73] Assignee: Colgate-Palmolive Company, New York, N.Y.

[*] Notice: The portion of the term of this patent subsequent to Jul. 26, 1994, has been disclaimed.

[21] Appl. No.: 746,446

[22] Filed: Dec. 1, 1976

[51] Int. Cl.$^2$ .......................... C09G 1/02; C11D 3/08
[52] U.S. Cl. ........................................ 252/525; 106/3; 424/49; 252/532; 252/545; 252/552; 51/308
[58] Field of Search .................. 51/308; 424/49, 52, 424/54; 106/3; 252/140, 155, 160, 525, 532, 545, 552

[56] References Cited

U.S. PATENT DOCUMENTS

| | | | |
|---|---|---|---|
| 3,715,842 | 2/1973 | Tredinnick et al. | 51/308 |
| 3,827,868 | 8/1974 | Burke | 51/308 |
| 4,035,163 | 7/1977 | McLaughlin et al. | 51/308 |
| 4,038,380 | 7/1977 | Cordon | 51/308 |

*Primary Examiner*—Donald J. Arnold
*Attorney, Agent, or Firm*—Richard N. Miller; Robert L. Stone; Herbert S. Sylvester

[57] ABSTRACT

Liquid scouring compositions possessing enhanced cleaning properties and reduced abrasion characteristics containing as the essential cleaning agent the abrasive calcium metasilicate, stably suspended in an aqueous vehicle.

13 Claims, No Drawings

LIQUID SCOURING CREAM CONTAINING CALCIUM METASILICATE

This invention relates to a stable liquid abrasive composition having superior cleaning and polishing characteristics on hard surfaces containing calcium metasilicate ($CaSiO_3$) as the sole abrasive ingredient or as part of an abrasive system.

It is desirable to use scouring creams on hard surfaces such as stainless steel, resin type surfaces such as those sold under the trademark Formica, ceramics and vitreous enamel such as porcelain, aluminum, and the like to provide effective cleaning without scratching said surfaces. It has been difficult to select suitable abrasives to afford maximum removal of difficult stains, grease and soil without damaging such surfaces. This is especially true of porous etched porcelain surfaces such as older sinks and bathtubs as well as softer surfaces such as Formica, aluminum, and fiber glass surfaces.

The function of an abrasive substance in formulations intended for use on hard surfaces is to remove various deposits and stains from the surface thereof and to generally clean them without unduly scratching said surfaces. An advantageous abrasive material for incorporation into scouring formulations should maximize soil and stain removal without causing undue abrasion (ie. scratching) to said hard surface. The typical abrasive heretofore used in liquid scouring compositions include finely divided silica, feldspar, pumice, kieselguhr, labradorite, calcite ($CaCO_3$), emery and carborundum. The particle size of said abrasive component has been such that substantially all of the dry particulate material passes through a sieve with apertures of 104 microns and at least 80% by weight passes through a sieve with apertures of 53 microns. Aforesaid abrasives have been found to be an effective cleanser on hard non-porous surfaces, but not as effective on porous etched procelain. In addition, said abrasives have been found to scratch such softer surfaces as Formica, aluminum and American Standard bathroom paneling.

It has now been found that the use of calcium metasilicate as the sole abrasive, or in conjunction with calcium carbonate, yields a liquid scouring composition which effects superior cleaning action and reduced abrasion.

Accordingly, a stable liquid abrasive composition possessing superior cleaning efficacy on etched porcelain surfaces and reduced abrasion on softer easily scratched surfaces such as aluminum, etc. can be formulated containing calcium metasilicate as an essential component of the abrasive system.

More particularly, instant invention relates to a stable liquid abrasive composition providing effective cleaning and reduced abrasion on porous and non-porous hard surfaces comprising about 45-55% by weight of an abrasive system containing at least 20% by weight of calcium metasilicate in the form of particles having a mean diameter in the range of about 5.5 to 16 microns and having a Mohs hardness value of 5, in an aqueous vehicle containing about 2-15% of at least one surface active agent selected from the group consisting of anionics and non-ionics.

Ground glass (calcium silicate) has been cited in the prior art (U.S. Pat. Nos. 3,767,791 and 3,151,027) as a hard abrasive constituent in a dentifrice composition, and in a polishing composition for laquers, enamels, metal or wood (U.S. Pat. No. 1,965,299). However, said commercial silicate glass is not pure calcium silicate, but is primarily a source of silica and is composed of about 72% $SiO_2$, 15% $Na_2O$, 0-1% $K_2O$, 9% CaO, 1% $Al_2O_3$, and 3% MgO, as defined in the Encyclopedia of Chemical Technology by R. E. Kirk and D. F. Othmer, Vol. 7, Interscience, N. Y., 1951.

An alkaline-reacting, precipitated, hydrated calcium silicate, known in the trade as "Silene" has been used in a polishing composition for baked resin finishes on automobile bodies (U.S. Pat. No. 2,375,825). However, "Silene" is not calcium metasilicate, but is composed of 18% CaO and 64% $SiO_2$ and has an average particle size under 1 micron.

The calcium metasilicate of this invention is a water insoluble naturally occurring, brilliant white, substantially pure calcium metasilicate (e.g. about 98% pure) having the chemical formula $CaSiO_3$, a molecular weight of 116, and is composed of about 50.9% $SiO_2$ and about 46.9% CaO, with minor amounts of impurities. These impurities may include about 0.55% FeO, 0.25% $Al_2O_3$, 0.10 MnO, 0.10% MgO, 0.05 $TiO_2$, and 0.90 moisture (by loss on ignition). Calcium metasilicate should be in particulate form with an average mean particle size typically in the range of about 3 microns to 16 microns, and preferably about 5.5 to 16 microns. It is preferable that at least about 33% of the $CaSiO_3$ particles are less than 10 microns in diameter and substantially all the particles are less than 40 microns in diameter, with at least 60% being less than 20 microns in diameter. More specifically, the calcium metasilicate may comprise 97-100% particles having diameters less than 40 microns, 60-97% having diameters less than 20 microns, 33-74% having diameters less than 10 microns, 20-46% having diameters less than 5 microns, and 15-35% having diameters less than 3 microns and 10-17% having diameters less than 1 micron. Other chemical and physical properties of calcium metasilicate include an acicular crystalline structure, a specific gravity of 2.9, a refractive index of 1.63, a melting point of 1540° C., a hardness value of 4.5 to 5 on Moh's scale, a weight of 2.90 kg per solid liter, and a 10% aqueous slurry thereof exhibits a pH of 9.9. Calcium metasilicate has been found to be particularly effective as a cleaning and polishing agent with reduced abrasion characteristics.

Wollastonite from Interpace Corporation is a white, natural mineral of substantially pure calcium metasilicate, which may be processed into grades in accordance with particle size.

The presence of the $CaSiO_3$ (Wollastonite) in the scouring cleanser is found to impart improved surface cleaning and stain removal characteristics without scratching the cleaned surfaces.

The proportion of calcium metasilicate in this cleanser may be at least 20% when used in conjunction with other abrasives such as calcium carbonate and the like, and in the range of about preferably 45 to 47% when used as the sole abrasive. If less than about 45% calcium metasil cat is used, the viscosity falls below that required to maintain this material in suspension and it settles out rapidly. If more than 47% calcium metasilicate is used then the product becomes too viscous and ceases to be pourable. A viscosity in the range of about 2300 cps to 5000 cps and preferably 2500 to 4000 cps is required in order to obtain a stable pourable liquid product in the form of a cream.

The calcium metasilicate may constitute the sole abrasive or may be part of an abrasive system. Accordingly, other abrasives conventionally utilized in liquid abrasive cleansers may be included, such as calcium carbonate ie. calcite (ground marble), silica, feldspar, pumice, kieselguhr, labradorite, emery. The particle size of aforesaid abrasives are typically such that all of the particles pass through a sieve with apertures of 104 microns and at least 80% pass through a sieve with apertures of 53 microns. The proportion of such additional abrasive in the cleanser may be in the range of 0 to 35%. Typically, the total abrasive content is generally in amounts from about 45 to 55% by weight of the composition.

The term "stable" as used herein means a dispersion of insoluble abrasive particles in a liquid medium in which those particles remain in suspension without substantially settling and without forming a cake and in which the suspension is maintained over an extended period of time under varying temperature conditions. The suspension is also readily pourable at room temperature even after long periods of storage under varying temperature conditions.

To make stable liquid scouring cleansers, the calcium metasilicate is dispersed in an aqueous vehicle which preferably contains a polyol humectant such as glycerine, sorbitol, propylene glycol or polyethylene glycol 400, including suitable mixtures thereof. Polyethylene glycols of higher molecular weight, e.g., polyethylene glycol 600, etc., may also be used. The total liquid content is generally in excess of 30% by weight of the vehicle (sorbitol, or other humectant is considered as a liquid for this purpose). The preferred humectants are glycerine and sorbitol. Typically, the vehicle contains up to about 4% by weight and preferably about 0.1 to 2% of a polyol humectant.

The vehicle also contains at least one surface-active agent, e.g., to achieve increased detergency action. The organic surface-active material may be anionic and/or nonionic, in nature, and it is preferred to employ as the surface-active agent a detersive material which imparts to the composition detersive and foaming properties. Anionic detergents suitable for use herein include but are not limited to water soluble higher alkyl benzene sulfonate detergent salts wherein the alkyl group contains about 10 to 18 carbon atoms, for example, alkali metal and triethanolamine salts of alkyl aryl sulfonic acids, e.g., sodium dodecyl or tridecyl benzene sulfonate, the sodium salt of tetrapropylene benzene sulfonic acid, the triethanolamine salt of dodecyl benzene sulfonic acid and the sodium salt of pentapropylene benzene sulfonic acid; water soluble sulfated and sulfonated detergent salts containing a hydrophobic alkyl radical of about 10 to 18 carbon atoms such as higher alkyl sulfate, e.g., sodium lauryl sulfate and higher fatty acid monoglyceride sulfates, such as the sodium salt of monosulfate of coconut oil fatty acid monoglyceride; sulfated ethylene oxide condensates with higher aliphatic alcohols, e.g. $C_{10-18}$ fatty alcohols, the amount of ethylene oxide varying considerably but generally will have about 2 to 15 moles per mole of hydrotrope; soaps, such as the potassium soap of mixed oleic and coconut oil fatty acids; and anionic phosphate surfactants in which the anionic solubilizing group attached to the hydrophobic group is an oxyacid or phosphorous are also useful in the detergent compositions. Suitable phosphate surfactants are the sodium, potassium and ammonium alkyl phosphate esters, such as $(R-O)_2 PO_2M$ and $ROPO_3M_2$ in which R represents an alkyl chain containing about 8 to about 20 carbon atoms or an alkyl phenyl group having about 8 to 20 carbon atoms and M represents a soluble cation. The compounds formed by including about one to 40 moles of ethylene oxide in the foregoing esters, e.g., $R-O(E=O)n_2 PO_2 M$, are also satisfactory. The amount of anionic detergent used is generally from about 0.5 to 10% and preferably about 5 to 10% by weight of the total composition.

Nonionic surfactants useful in the compositions of the invention include fatty acid mono- and dialkylolamides such as coconut diethanolamide, and condensation products of lower alkylene oxides such as ethylene oxide with alkyl phenols, fatty acids, fatty alcohols or fatty acid amides.

Examples of nonionic surfactants include monoethers of polyethylene glycols and long chain alkanols in which the alkanol has 10 to 16 carbon atoms and the polyethylene glycol has 5 to 15 oxyethylene units. Still another nonionic detergent is a condensation product of long chain alkanol, propylene oxide and ethylene oxide.

Other examples are the reaction product of isooctyl phenol with 6 to 30 ethylene oxide units; condensation products of alkyl thiophenols with 10 to 15 ethylene oxide units; condensation products of higher fatty alcohols such as tridecyl alcohol with ethylene oxide; addends of monoesters of hexahydric alcohols and inner ethers thereof such as sorbitan monolaurate, sorbitol mono-oleate and mannitan monopalmitate with ethylene oxide (e.g about 60 mols); and condensation products of polypropylene glycol with ethylene oxide. Still another suitable non-ionic surfactant is coco diethylamine oxide and other higher fatty alkyl diethylamine oxides.

The preferred non-ionic surfactant is a condensate of a higher fatty acid lower alkylolamide with a lower alkylene oxide. In these condensation products the higher fatty acid is of about 10 to 18 carbon atoms, the alkylolamide is preferably a monoalkylolamide, the alkylol radical has about 2 to 3 carbon atoms and the alkylene oxide is also of about 2 to 3 carbon atoms. About 1–6, i.e. 1.5 to 5.5 moles of lower alkylene oxide are condensed with each mole of alkylolamide. A preferred condensate is that of a higher fatty acid and monoethanolamide with an average of about 1.5 to 2.5 moles of ethylene oxide in which the higher fatty acid is a mixture of fatty acids obtained from coconut oil. Exemplifying such materials are the condensation products of lauric monoethanolamide with two moles of ethylene oxide. A non-ionic surfactant content of about 1–5% is suitable with 2% being preferred.

It is preferred that the total amount of surfactant be about 2–15% by weight, preferably 5–10% of the cleanser.

The composition of the invention preferably includes inorganic salts such as sodium or potassium carbonate in an amount of about 0.05 to 6% preferably about 1 to 3%. This material is useful as a builder and for adjusting the pH of the composition which will advantageously be maintained at about 8 and 12, preferably about 10 to 11.5. In addition it has been found to contribute to the stability of the composition.

Other inorganic salt found to enhance the stability of the final composition in amounts of about 1 to 3% include the alkali metal sulfates.

The alkali metal silicates which are also useful in the invention include anhydrous and hydrated silicates of the alkali metal of Group I of the periodic table as well as ammonium. The silicates which are used are generally the sodium and potassium silicates, and preferably sodium silicates in which the $Na_2O$ to $SiO_2$ ratio is about 1:1.5 to 1:4, most preferably about 1:2 to 1:3.5. Mixtures of the above silicates can, of course, also be used. The silicate helps to form a stable product and also gives the composition anticorrosion properties. Amounts of about 1-3% by weight of the total composition is preferred.

The liquid abrasive compositions of the present invention may also contain as optional constituents, water soluble and water insoluble adjuvants found desirable inclusive of germicides and bactericides, lanolin, dyes, pigments, silicones, opacifying agents, perfumes, preservatives such as formalin, sodium or potassium bicarbonate, borax and the like. Each of these adjuvants may be typically incorporated in instant compositions in amounts up to 5%.

A suspending agent may also be included in the composition to assist in preventing the settling out of the abrasive during storage and to improve its stability or shelf life. Suitable suspending agents are natural and synthetic clays such as bentonite, "Laponite" (registered trademark of Laporte Industries Limited) and mixtures thereof, more fully described in U.S. Pat. No. 3,966,432, said material being incorporated herein by reference, in amounts up to 1% by weight of the total composition.

The choice of non-aqueous materials and the proportions of ingredients utilized in the liquid scouring cleanser of this invention is determinative of the suspension properties and the viscosity of the final product as well as of the detergency, lathering and grease-emulsifying properties thereof. The viscosity of the composition is not merely a function of the percentage of non-aqueous material in the liquid medium or of the percentage abrasive therein, but is a resultant of the total composition, as will be more specifically illustrated in the examples.

The compositions of this invention may be prepared by mixing the calcium metasilicate abrasive (Wollastonite) with a clear aqueous solution which may contain dissolved therein coloring material, inorganic salts such as sodium carbonate and sodium silicate, humectant such as sorbitol, then sequentially mixing in the anionic detergent, the non-ionic surfactant and lastly adding the perfume if used. This mixing process is preferably conducted at an elevated temperature of about 120° F., until a smooth cream is obtained. The perfume is preferably added after said composition is cooled to about 85° F.

More specifically, the method contemplated herein for forming a stable abrasive composition includes the steps of heating a formula amount of water with or without coloring materials to a temperature of about 120° F. The alkali metal carbonate, silicate and polyol humectant is added to the heated water and the mixture is suitably agitated, until the composition is substantially clear at which time the calcium metasilicate abrasive particles per se or together with the calcium carbonate abrasive are added. This mixture is then again agitated, preferably with a Homogenizer Mixer, until the composition is predominantly free from lumps. The anionic detergent and/or the non-ionic detergent is then separately added and dispersed in the composition which is then cooled to about 80°-90° F. In a preferred embodiment and in furtherance of the objective of obtaining a stable product, a perfume where desired, is added at the stage of the mixing procedure where the lowest temperature has been achieved, prior to a final cooling step such as between the step of adding said anionic or non-ionic detergent and the step of cooling the formulation. The agitation is continued until the composition is preferably substantially homogeneous and is then cooled to about room temperature.

The resulting compositions may be packaged in a variety of containers or dispensers, such as plastic or glass bottles, metal cans, aerosol dispensers and the like.

The following examples illustrate the nature of the invention. It will, of course, be understood that the invention is not limited to the details of the examples. In the following example as well as throughout the specification and claims all proportions, parts and ratios are by weight unless otherwise specified.

EXAMPLE I 820 grams (41%) of water and 16 grams (0.8%) FD and C yellow #5 is heated to a temperature of 120° F. and there is added thereto 20 grams (1%) anhydrous sodium carbonate, 20 grams (1%) sodium silicate and 40 grams (2%) sorbitol. Mild agitation is continued until the composition becomes clear, indicating the formation of a solution. While continuing the agitation, there is added 900 grams (45%) of finely divided Wollastonite P-1, the particles thereof having a mean particle size of 8.9 microns and the following particle size distribution:

| Microns | Percentage |
| --- | --- |
| less than 40 | 99.8 |
| less than 20 | 92 |
| less than 10 | 60 |
| less than 3 | 24 |
| less than 1 | 12 |

The agitation is increased and the composition is subjected to a homogenizing action until the composition becomes smooth, i.e., no indication of lumps. The speed is then increased and there is added 38 grams (6.9%) of a slurry of sodium linear dodecylbenzene sulfonate having 45% active ingredients and 40 grams (2%) of a condensation product of the monothanolamide of coconut oil fatty acids with 2 moles of ethylene oxide. The composition is cooled to 90° F. and 2 grams (0.1%) formalin is added and the mixing is continued. The composition is cooled to 85° F. and 4 grams (0.2%) perfume are added and the mixing is continued, at which time the mixture appears to be homogeneous. The formulation is then cooled to 80° F. The viscosity of this composition is 2340 cps, and has a pH of 11.2.

The perfume used in the above example is one in which the major constituents (75%) are a mixture of lemon oil terpenes, d-limonene, and dipentene in equal amounts with the balance of 25% of the composition being primarily a mixture of citral, aldehydes and diethyl phthalate. The product formed will be found to be stable when tested under varying temperature conditions. In addition, the product can be also used on formica, etched porcelain, aluminum and fiber glass bathroom panels without substantially scratching the same and when tested for soil and stain removal is as effective as a conventional, commercial scouring cleanser.

A method of determining the abrasion of the abrasive cleansers utilizes a Gardner straight line washability and abrasion machine (a reciprocal brushing machine) equipped with a Photovolt Reflection Meter with the Gloss Meter Head at 45°, wherein the particular surface to be tested is subjected to 40 reciprocal strokes with a sponge containing an aliquot portion of the abrasive cleanser, and the reflectance value before and after is determined. A lower reflectance change indicates less abrasion.

In a comparison of this composition with a prior art abrasive composition, wherein 55% calcium carbonate having a mean particle size of 80 microns and a Mohs hardness of 3, was used in lieu of the 45% Wollastonite and the water content was adjusted accordingly, the substantial decrease in abrasivity of instant composition was clearly shown as evidenced by the following results.

TABLE I

| Surface | Formula | (Rd) Original Reflectance | (Rd) Reflectance after 40 Strokes | Δ Average Rd |
|---|---|---|---|---|
| Formica | Prior Art | 65 | 48 | 20.3 |
| | | 66 | 42.5 | |
| | Example 1 | 65 | 51 | 15.5 |
| | | 66 | 49 | |
| Aluminum | Prior Art | 98.5 | 28 | 71 |
| | | 97.5 | 26 | |
| | Example 1 | 70 | 34 | 40.5 |
| | | 83 | 38 | |
| Fiber Glass Bathroom Panel | Prior Art | 65 | 42 | 19.5 |
| | | 58 | 42 | |
| | Example 1 | 58 | 54 | 3 |
| | | 57 | 55 | |

In addition to exhibiting reduced abrasivity as clearly shown above, instant composition is a more efficient cleanser as shown by the following results wherein etched porcelain with and without a stain is tested.

TABLE 2

| | Etched Porcelain - Aluminum Stain | | | |
|---|---|---|---|---|
| Formula | Original Stain Level (Rd) | No Stain (Rd) | (Rd) after 40 Strokes | % Clean |
| Prior Art | 63 | 79 | 71 | 50 |
| Example 1 | 63 | 79.5 | 74 | 55 |

EXAMPLE 2

Example 1 is repeated except that 6.3% of the slurry of dodecyl benzene sulfonate containing 48% active ingredients (AI) is substituted for the 6.9% of the 45% AI slurry, and the water is adjusted to 41.6%. The resultant product has a viscosity of 2,860 cps with the same beneficial results.

EXAMPLE 3

Example 2 is repeated except that 47% Wollastonite P-1 is used in lieu of 45% and the water content is adjusted to 39.6%. The resultant product has a viscosity of 3560 cps and a pH of 11.4 with similarly beneficial results.

EXAMPLE 4

Example 2 is repeated, but the Wollastonite is reduced to 20% and 35% calcium carbonate (Marble Dust 1095 which has a mean particle size of 80 microns and a Mohs hardness of 3) is substituted for the remainder of the abrasive content, and the water content is adjusted to 31.8%. The final product has a viscosity of 3,960 cps and a pH of 11.6 with similar beneficial results.

EXAMPLE 5

Example 4 is repeated, but the calcium carbonate content is reduced to 30% and the water adjusted to 36.8%. The final product has a viscosity of 2320 cps and a pH of 11.5 with similar beneficial results.

EXAMPLE 6

Example 5 is repeated except that the calcium carbonate content is further reduced to 28% and the water content adjusted to 38.8%. The resultant composition has a viscosity of 1760 cps which is too low to form a stable cream, (settling out of solids). Thus, it is apparent that when using a mixture of 20% Wollastonite with calcium carbonate, the total abrasive is preferably at least 50% in order to obtain a stable cream.

EXAMPLE 7

Example 1 is repeated except that the Wollastonite content is reduced to 20% and 32% calcium carbonate (Marble Dust) is added, and the water content is adjusted to 34.2%. The final product has a viscosity of 2960 cps and a pH of 11, with the same beneficial results.

EXAMPLE 8

Example 1 is repeated except that a different grade of Wollastonite is used (C-1) which has a mean particle size of 13 microns and the following particle distribution:

| Microns | Percentage |
|---|---|
| less than 40 | 96.5 |
| less than 20 | 70 |
| less than 10 | 42 |
| less than 5 | 24 |
| less than 3 | 17 |
| less than 1 | 11 |

The resultant product has a viscosity of 2,640 cps and a pH of 11.2 with similarly good results.

EXAMPLE 9

Example 1 is repeated but 50% Wollastonite C-6 having a mean particle size of 16 microns and the following particle size distribution is used, and the water content is adjusted to 36%:

| Microns | Percentage |
|---|---|
| less than 70 | 97.7 |
| less than 20 | 60 |
| less than 10 | 33 |
| less than 5 | 20 |
| less than 3 | 15 |
| less than 1 | 10 |

The resultant composition has a viscosity of 3960 cps with similarly good results.

EXAMPLE 10

Example 1 was repeated but the color ingredient was omitted and the water content adjusted to 41.8%. The final product has a viscosity of 3520 cps and a pH of 11.4

EXAMPLE 11

Example 10 was repeated except that Wollastonite P-4 is substituted for the P-1 grade.

The P-4 grade has a mean particle size of 5.5 microns and the following particle size distribution:

| Microns | Percentage |
| --- | --- |
| less than 40 | 99.9 |
| less than 20 | 97 |
| less than 10 | 74 |
| less than 5 | 46 |
| less than 3 | 35 |
| less than 1 | 17 |

EXAMPLE 12

Example 1 is repeated except that 1% sodium sulfate is added and the water content is reduced to 40%. This product is very stable and exhibits no separation of solids even after accelerated aging at elevated temperatures.

EXAMPLE 13

Example 1 is repeated except that coco-diethylamine oxide is substituted for the monoethanolamide constituent. The final product has an acceptable viscosity but it contains a characteristic amine oxide odor which is not masked by the perfume.

EXAMPLE 14

Example 1 is repeated, but 0.2% Laponite is added and the water content reduced accordingly. The resulting composition remains stable even after aging at 110° F. for two months.

It is also within the broader scope of the invention to substitute other abrasives for the calcium carbonate such as silica or any of the other aforementioned abrasives. Similarly other anionic and non-ionic surface active agents may be substituted for those specified in the examples.

The particle diameters given in the examples are determined by conventional methods. Thus, the standard liquid sedimentation technique may be used. The calculation of particle diameter from the sedimentation data being made (as is conventional) on the basis of Stokes' Law, disregarding the particular shape of the particles.

It is understood that the foregoing detailed description is given merely by way of illustration and that variations may be made therein without departing from the spirit of the invention. The "Abstract" given above is merely for the convenience of technical searchers and is not to be given any weight with respect to the scope of the invention.

We claim:

1. A stable, pourable, liquid scouring composition providing effective cleaning with reduced abrasion on porous and non-porous hard surfaces comprising about 45–55% by weight of an abrasive system containing at least 20% by weight of calcium metasilicate in the form of particles having a mean diameter in the range of about 5.5 to 16 microns and having a Mohs hardness value of about 5, suspended in an aqueous vehicle containing about 2–15% by weight of at least one surface active agent selected from the group consisting of anionic and nonionic detergents.

2. A composition in accordance with claim 1, wherein the abrasive system constitutes about 45–47% by weight of calcium metasilicate.

3. A composition in accordance with claim 1, which also contains about 0.1 to 4% by weight of polyol humectant.

4. A composition in accordance with claim 1, wherein said surfactant is an anionic surfactant which constitutes about 0.5 to 10% by weight of the total composition and is selected from the group consisting of water-soluble higher alkyl benzene sulfonate detergent salts wherein the alkyl group contains about 8 to 18 carbon atoms, water-soluble $C_{10}$–$C_{18}$ alkyl sulfate detergent salts, water-soluble $C_{10}$–$C_{18}$ fatty acid monoglyceride sulfate detergent salts, water-soluble sulfated ethylene oxide condensates of higher aliphatic alsohols having about 10 to 18 carbon atoms with about 2 to 15 moles of ethylene oxide and water-soluble alkyl phosphate ester detergent salts having a hydrophobe containing an alkyl chain of about 8 to 20 carbon atoms or an alkyl phenyl group having about 8 to 20 carbon atoms.

5. A composition in accordance with claim 1 wherein said surfactant is a nonionic surfactant which constitutes about 1 to 5% by weight of the total composition and is selected from the group consisting of fatty acid mono- and dialkylolamides, condensation products of ethylene oxide with alkyl phenols, fatty acids, fatty alcohols or fatty acid $C_2$–$C_3$ alkylolamides; monoethers of polyethylene glycols and long-chain alcohols; condensation products of long-chain alkanol, propylene oxide and ethylene oxide; and higher fatty alkyl diethylamine oxides.

6. A composition in accordance with claim 1, which also contains up to about 3% by weight of alkali metal carbonate.

7. A composition in accordance with claim 1, which also contains up to about 3% by weight of alkali metal silicate.

8. A composition in accordance with claim 1, which also contains up to about 3% by weight of alkali metal sulfates.

9. A composition in accordance with claim 8, which has a viscosity within the range of 2300 cps and 5000 cps and a pH of about 8 to 12.

10. A composition in accordance with claim 1, wherein said surfactant is a mixture of an anionic surfactant which is a water-soluble higher alkyl benzene sulfonate wherein the alkyl group contains about 8 to 18 carbon atoms with a non-ionic surfactant which is an ethoxylated $C_{1-3}$ alkylolamide of a $C_{10}$14 $C_{18}$ fatty acid with an average of about 1–4 moles of ethylene oxide.

11. A composition in accordance with claim 1, wherein said abrasive is a mixture of said calcium metasilicate and an abrasive selected from the group consisting of finely divided silica, feldspar, pumice, kieselguhr, labradorite, calcium carbonate, emery and carborundum.

12. A composition in accordance with claim 11 wherein said abrasive is a mixture of calcium metasilicate and calcium carbonate.

13. A composition in accordance with claim 1 which further contains up to 1% by weight of a suspending agent selected from the group consisting of natural clays, synthetic clays and mixtures thereof.

* * * * *